(12) United States Patent
Chou

(10) Patent No.: US 6,198,053 B1
(45) Date of Patent: Mar. 6, 2001

(54) FOLDABLE PUSHBUTTON-INPUT DEVICE

(75) Inventor: Chin-Wen Chou, Taipei (TW)

(73) Assignee: Shin Jiuh Corp., Hsin-Tien (TW)

( * ) Notice: Subject to any disclaimer, the term of this patent is extended or adjusted under 35 U.S.C. 154(b) by 0 days.

(21) Appl. No.: 09/414,973

(22) Filed: Oct. 12, 1999

(51) Int. Cl.$^7$ .................................................. H01H 13/70
(52) U.S. Cl. ............................................................ 200/5 A
(58) Field of Search ................................... 200/5 A, 512, 200/517, 341, 344, 345; 341/22; 361/680; 400/472, 490, 431, 491.2, 495, 495.1, 496

(56) References Cited

U.S. PATENT DOCUMENTS

| | | | |
|---|---|---|---|
| 5,653,543 | * 8/1997 | Abe | 400/489 |
| 5,712,760 | * 1/1998 | Coulon et al. | 361/680 |
| 5,733,056 | * 3/1998 | Meagher | 400/472 |
| 5,933,320 | * 8/1999 | Malhi | 361/680 |
| 5,941,648 | * 8/1999 | Robinson et al. | 400/82 |
| 5,943,041 | * 8/1999 | Allison et al. | 345/168 |

* cited by examiner

*Primary Examiner*—Michael Friedhofer
(74) *Attorney, Agent, or Firm*—Bacon & Thomas

(57) ABSTRACT

An improved foldable pushbutton-input device conformable to human body mechanism, wherein a plurality of assembly-jointing sections is defined by a plurality of properly spaced predetermined cutting lines on a baseboard; a circuit board made of a flexible material having a plurality of pushbutton-input circuit sections in positions corresponding with the assembly-jointing sections and also defined by the same cutting lines is attached on the baseboard; a signal-output circuit section is formed by extending the lateral edges of the pushbutton-input circuit sections and connected therewith; and a plurality of amount predetermined key sets is disposed on the circuit board or on the baseboard in virtue of the division cutting lines to thereby construct the foldable pushbutton-input device with a considerably reduced volume.

8 Claims, 7 Drawing Sheets

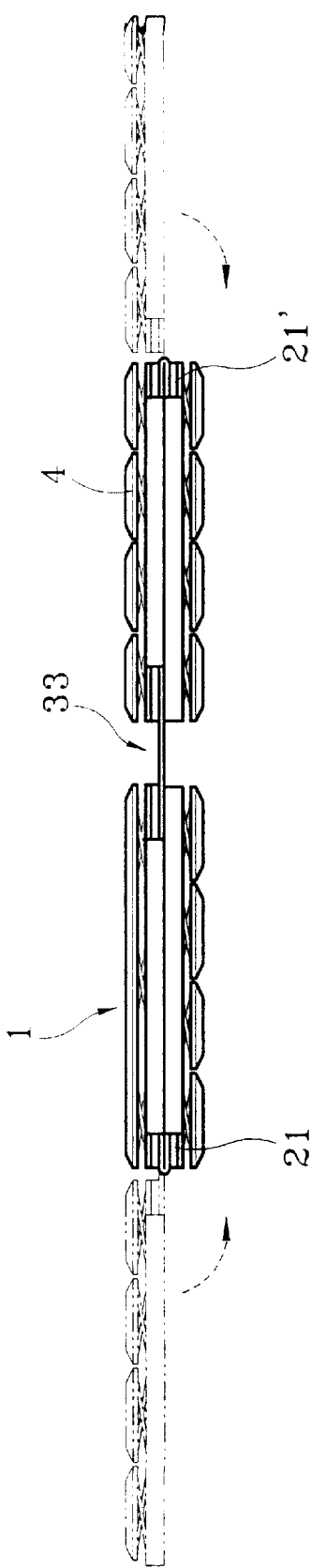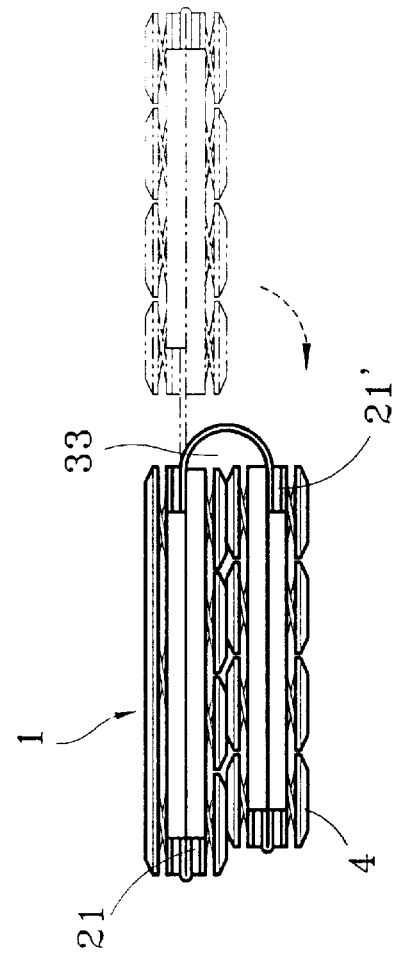

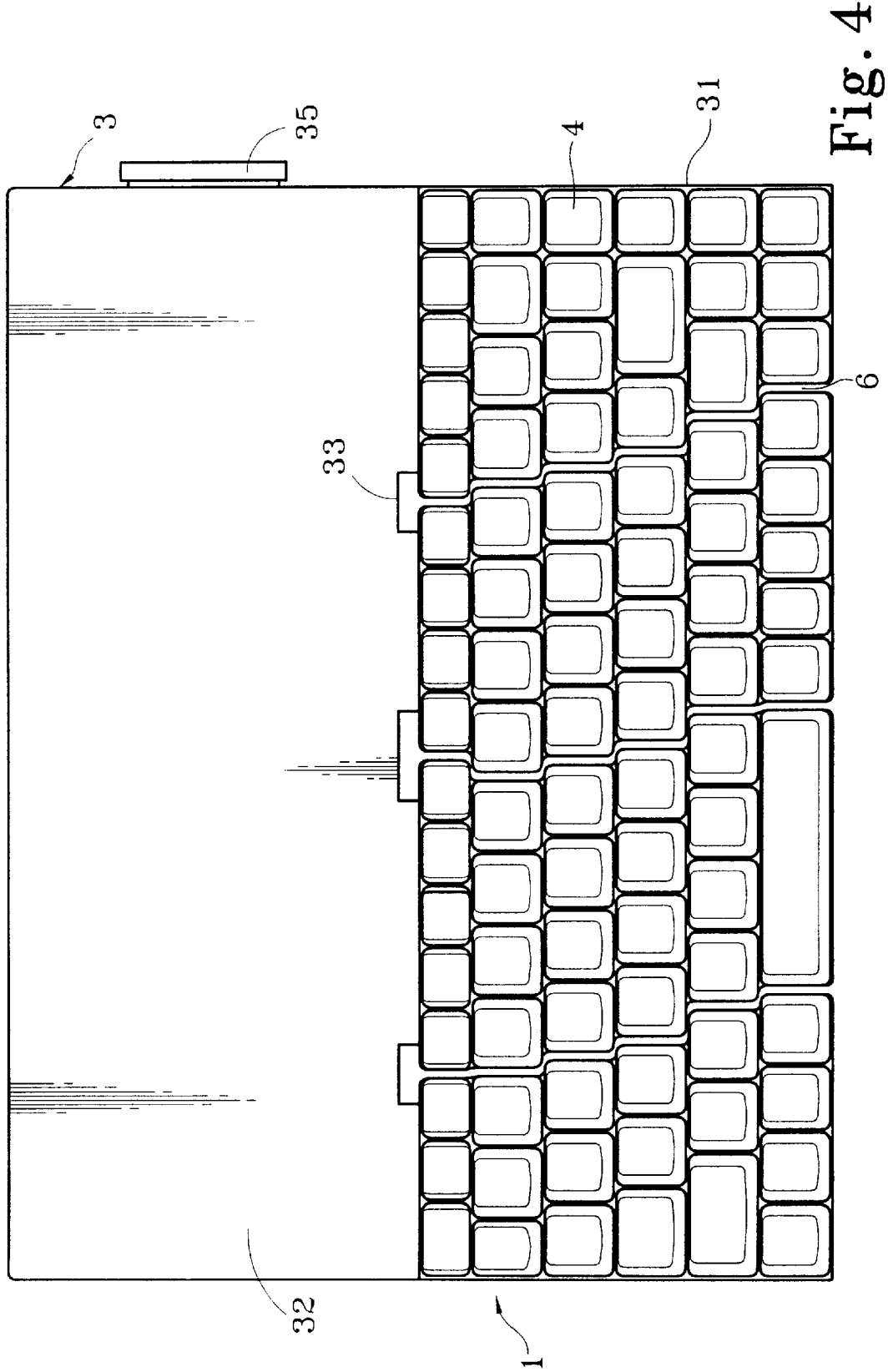

FOLDABLE PUSHBUTTON-INPUT DEVICE

BACKGROUND OF THE INVENTION

This invention relates to an improved pushbutton-input device, particularly to a pushbutton-input device foldable along cutting lines for reducing volume and enhancing portability thereof.

Following to maturity of the personal communication science, application of the mobile phone, the public domain account (PDA), etc have been extended to the scope of the Internet transmission already, and one of the major appeals until now is emphasizing in portability and appearance that urges designers to care about volume and weight of above-said products.

Taking the pushbutton-input device for example, some of the existing keyboards with relatively smaller pushbuttons do not conform to human body mechanism for operation, others with larger pushbuttons are awkward in portability, and it seems that the defects always accompany the merits.

SUMMARY OF THE INVENTION

The primary object of this invention is to provide an improved foldable pushbutton-input device portable and conformable to human body mechanism, wherein a plurality of assembly-jointing sections is defined by properly spaced predetermined positions of pushbuttons on a baseboard, and a plurality of pushbuttons and a circuit board made of a flexible material are assembled on the assemblyjointing sections, so that the pushbutton-input device can be folded along a plurality of cutting lines for reducing its volume.

Another object of this invention is to predetermine a binding area in the baseboard for combining the assembly-jointing sections with a signal-output circuit section in order to avail positioning the former.

A further object of this invention is to dispose a positioning sheet made of a flexible Polyester material on the bottom face of the baseboard to serve as an auxiliary measure for positioning the assembly-jointing sections.

BRIEF DESCRIPTION OF THE DRAWINGS

For a better understanding to the present invention, together with further advantages or features thereof, at least one preferred embodiment will be elucidated below with reference to the annexed drawings in which:

FIGS. 3A and 3B are schematic views illustrating folding action of this invention;

FIG. 4 shows another preferred embodiment of this invention; and

DETAILED DESCRIPTION OF THE PREFERRED EMBODIMENT

Figure 1:
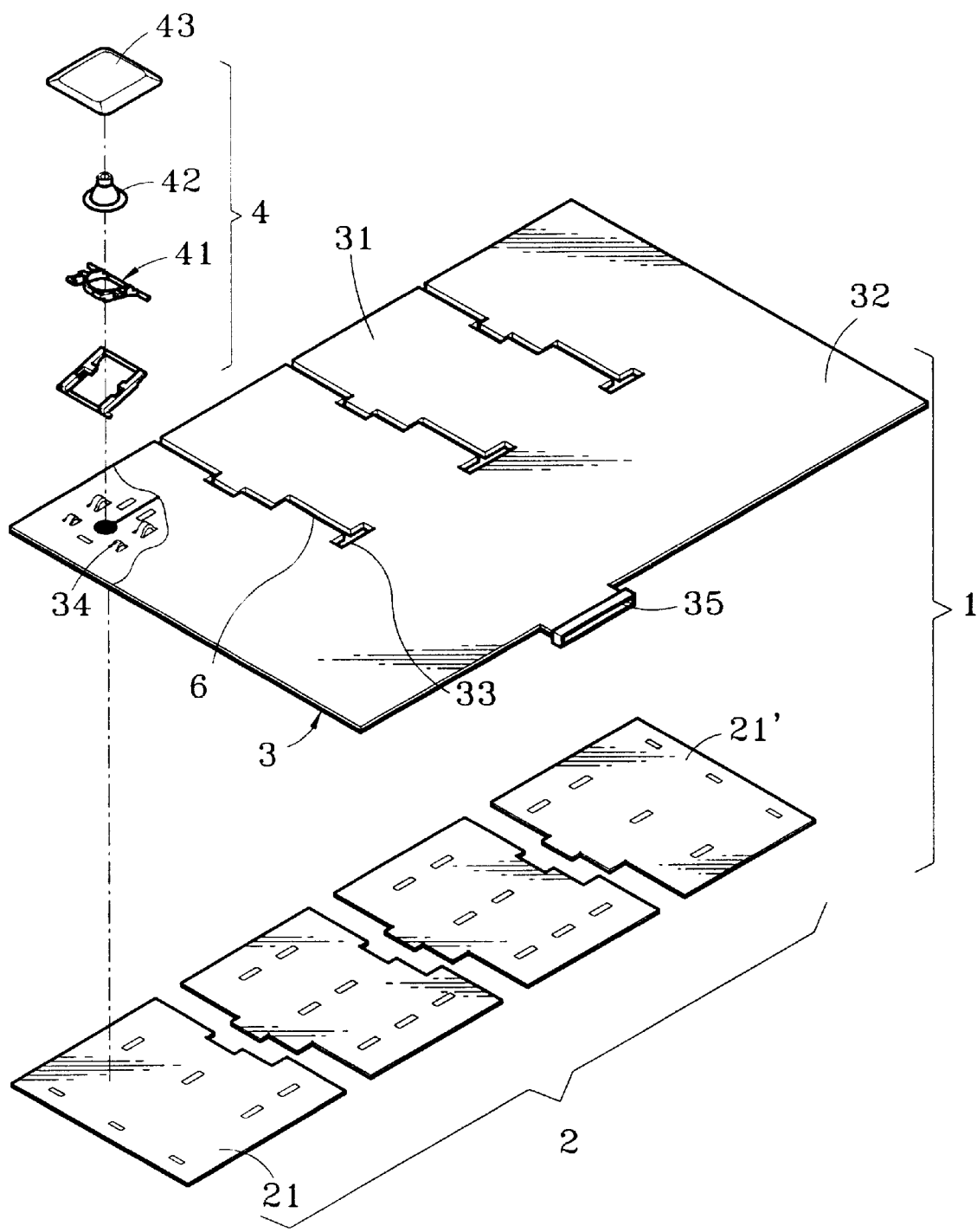
FIG. 1 is a schematic exploded view showing structure of this invention.
Figure 2A:
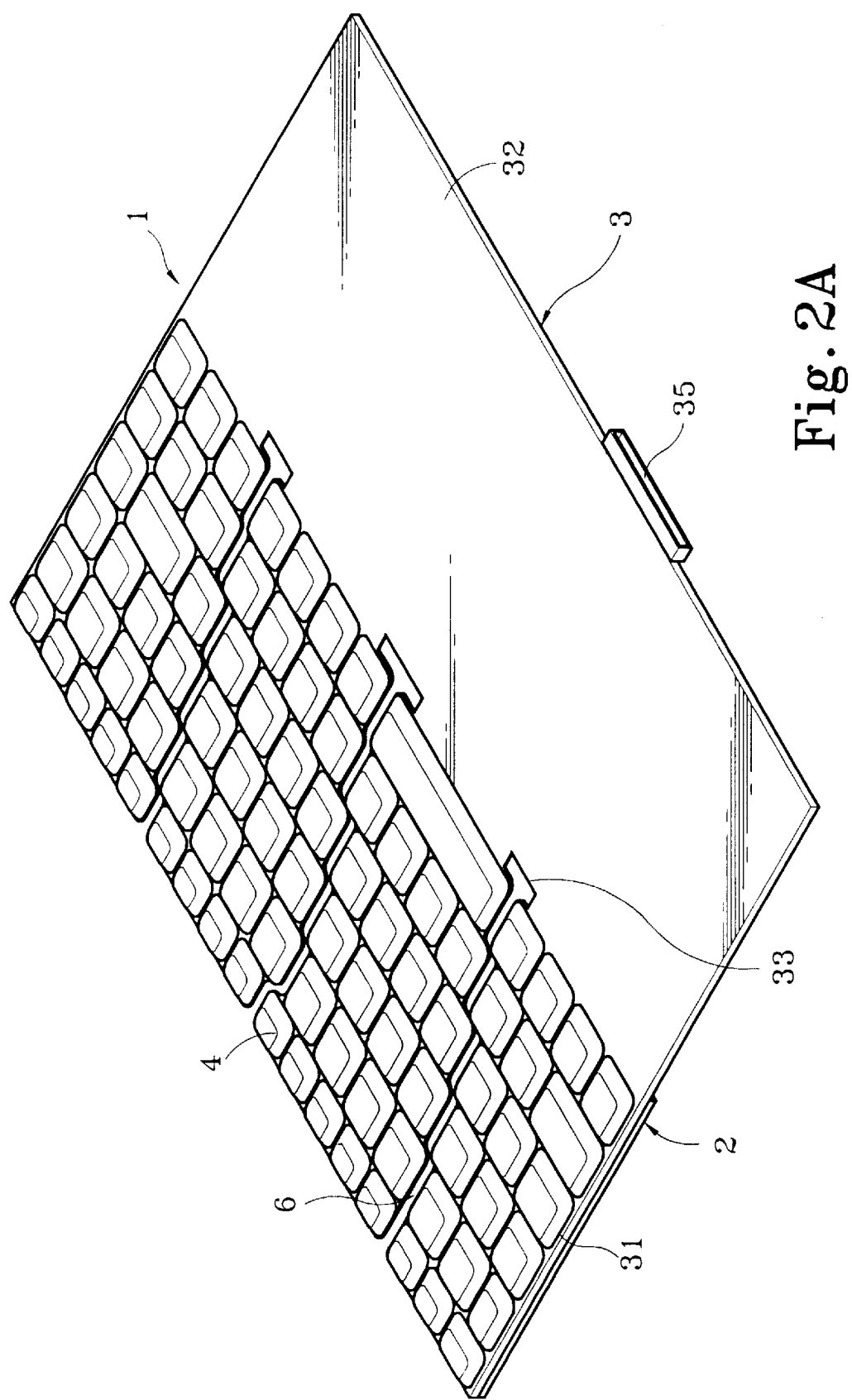
FIG. 2A is a schematic three-dimension elevational view of this invention after assembled.

As shown in FIGS. 1 and 2A an exploded structural view and a three-dimension elevational view this invention is to provide a foldable and portable pushbutton-input device 1 in compliance with human body mechanism, and is composed of a baseboard 2, a circuit board 3, and a plurality of key sets 4. On the baseboard 2 made of a metallic or a hard plastic material, a plurality of assembly-jointing sections 21 is defined by a plurality of properly spaced cutting lines 6 according to predetermined positions of pushbuttons. The circuit board 3 made of a flexible material, such as Polyimide, having a plurality of pushbuttoninput circuit sections 31 defined by the cutting lines 6 in positions corresponding with the assembly-jointing sections 21 is adhered on the baseboard 2. The pushbutton-input circuit sections 31 are extended laterally to form a signal-output circuit section 32, which is perforated to form at least a slot 33 at a proper position corresponding to the cutting line 6 according to thickness of the pushbutton. On the circuit board 3 or the baseboard 2, the plurality of key sets 4 is disposed on the pushbutton-input circuit sections 31 of the circuit board 3 or on the assembly-jointing sections 21 of the baseboard 2 in amount as required. Each key set 4 comprises a link (bridge) 41 pivotally mounted on the circuit board 3 or the baseboard 2, an elastomer 42 laid in the link 41, and a key cap 43 assembled on the top end of the elastomer 42 to joint with the link 41. As shown in FIG. 1, a representative pivot-jointing portion 34 in the circuit board 3 or a pivot-jointing portion (not shown) in the baseboard 2 is formed by direct squeezing or pressing for pivot-jointing with a terminal of the link 41. (As the assembling method of the key set 4 or the pivot-jointing manner of the link 41 is already known and nothing concerned with claim scope of this invention, hence, it will not be repeatedly elucidated further.)

Figure 2B:
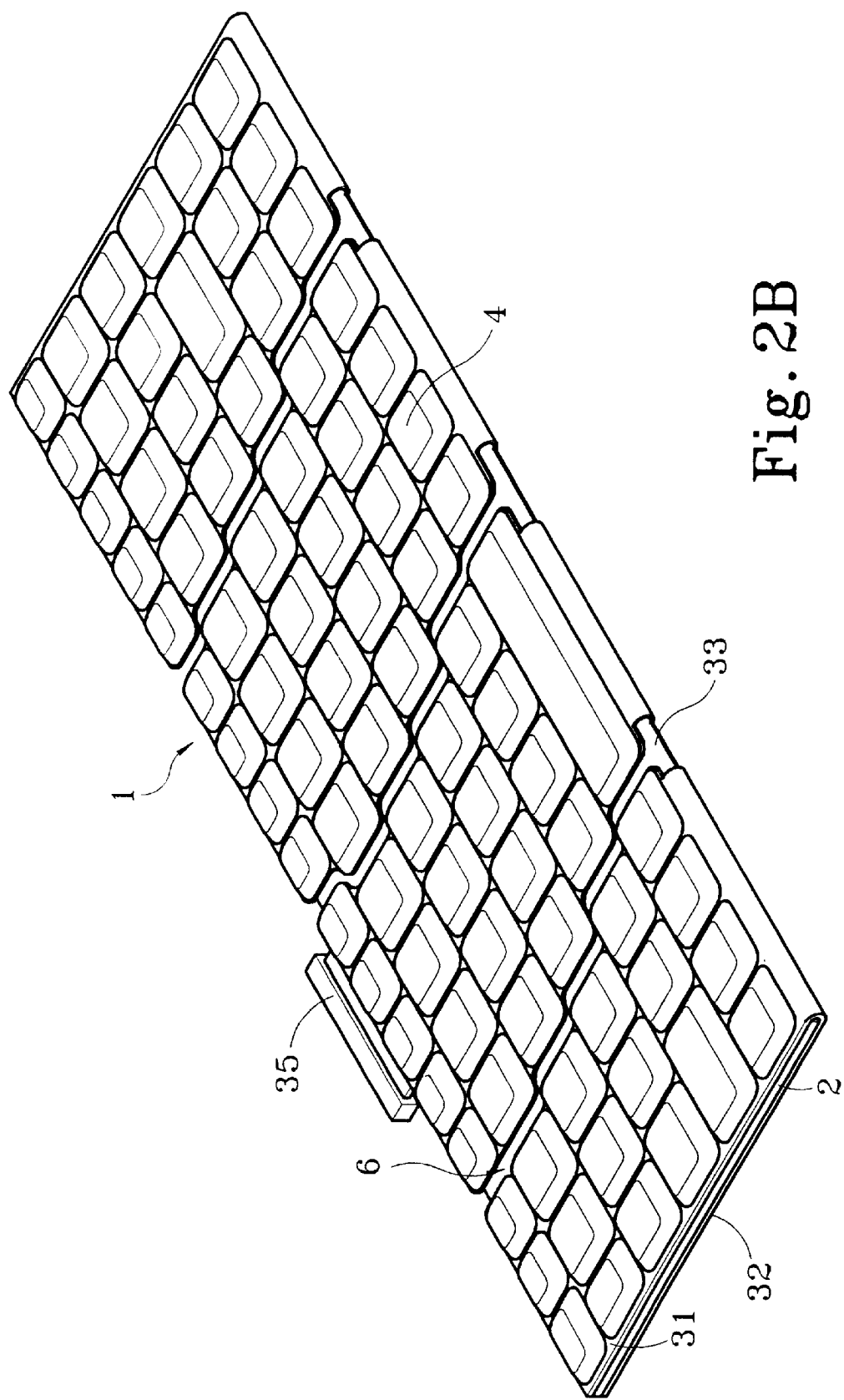
FIG. 2B is a schematic view illustrating action of FIG. 2A.
Figure 5:
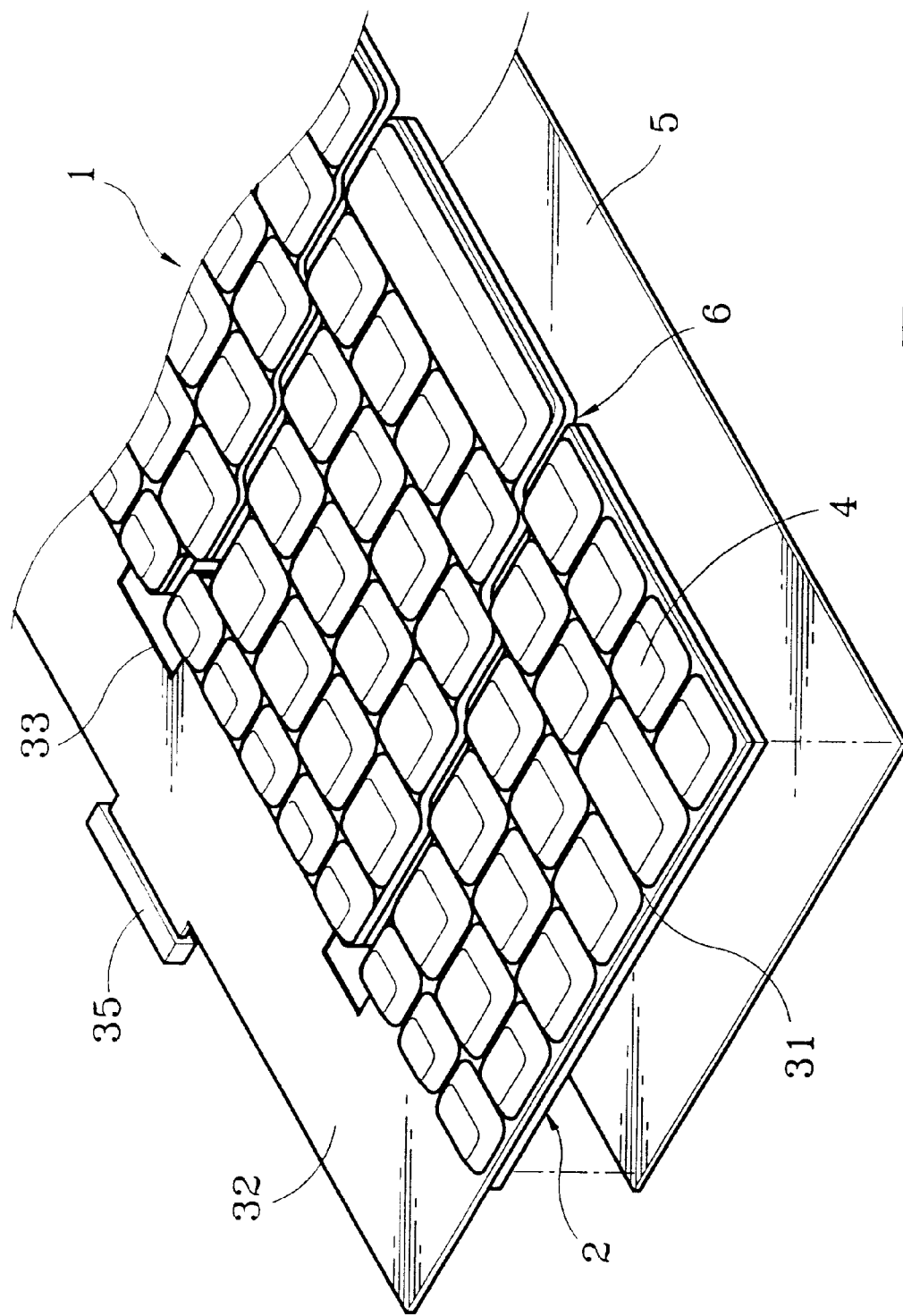
FIG. 5 shows yet another preferred embodiment of this invention.

As shown in FIGS. 2A and 2B, the assembly procedure is to firstly joint the pushbutton-input circuit sections 31 with the assembly-jointing sections 21 of the baseboard 2 defined by the cutting lines 6, then install each key set 4 on each pushbuttoninput circuit section 31. (Or, it can be done by disposing the circuit board 3 and the key sets 4 on the baseboard 2, then define the assembly-jointing sections 21 and the pushbutton-input circuit sections 31 by marking the cutting lines 6.) The second step, as shown in FIG. 2B, is to determine a binding area in the signal-output circuit section 32, which is to be folded and combined with the bottom face of the assembly-jointing sections 21; or, as shown in FIG. 5, prepare a positioning sheet 5 made of a flexible Polyester material underneath the baseboard 2 to serve as an auxiliary measure for positioning the assembly-jointing sections 21, and meanwhile, joint a signal-output connector 35 to a lateral edge of the signal-output circuit section 32 of the circuit board 3 to thus construct a pushbutton-input device 1. (The signal-output connector 35 can be alternatively disposed at a lateral edge of the signal-output circuit section 32 shown in FIG. 4.)

Figure 3C:
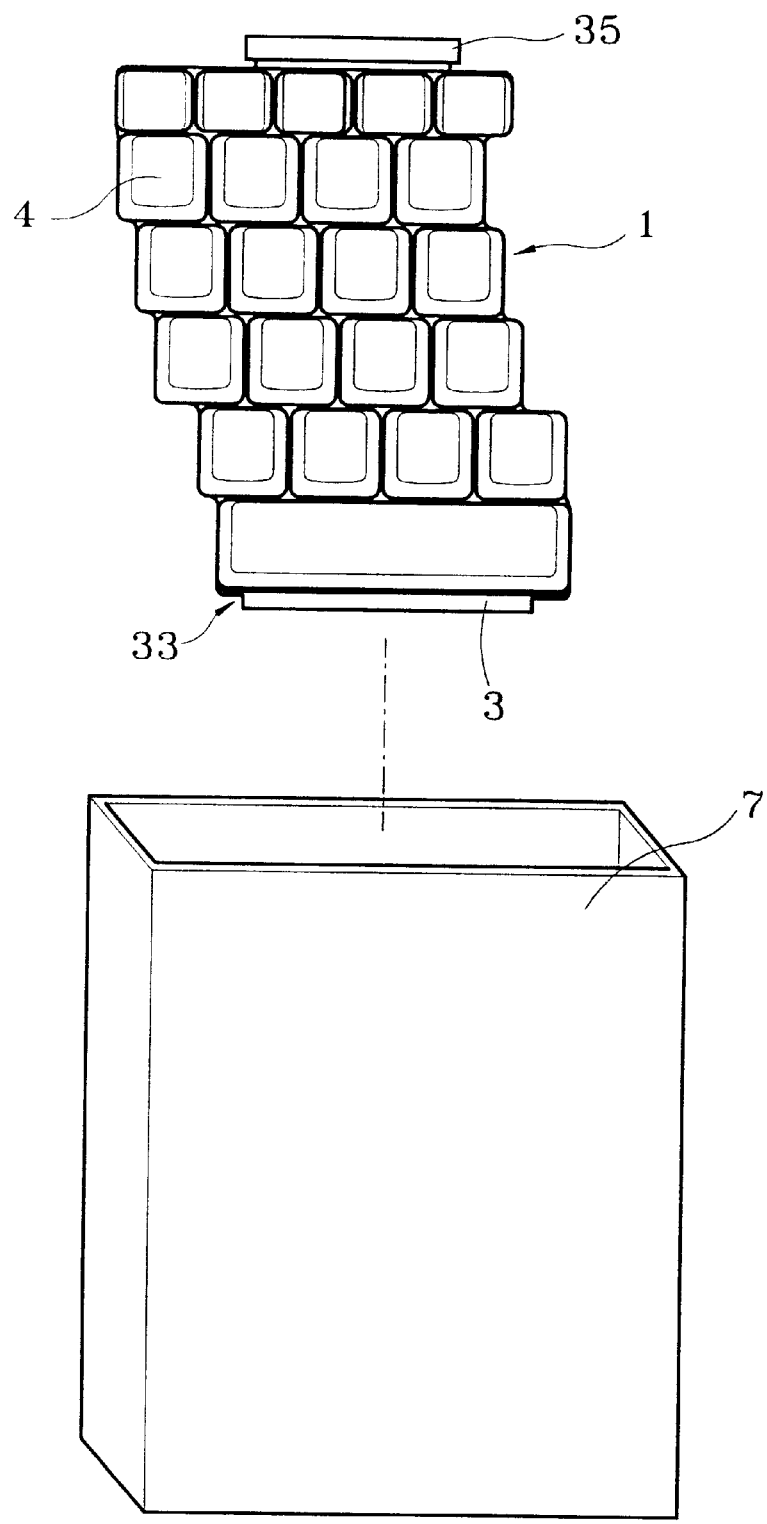
FIG. 3C shows a preferred embodiment of this invention.

Referring to folding action of this invention shown in FIGS. 3A and 3B, when a user is to pack the pushbutton-input device 1, he is supposed to fold the assembly-jointing sections 21, 21' simultaneously with the key sets 4 disposed thereon inwards along the cutting lines 6 in virtue of the flexibility of the circuit board 3 and the slots 33 formed according to thickness of the pushbutton and thereby reduce volume of the pushbutton-input device 1 considerably for storing the same in a box 7. (To reduce volume to one fourth of the original is possible shown as FIG. 3C.)

On the contrary, when using the pushbutton-input device 1 is desired, he is supposed to unfold it by assistance of the signal-output circuit section 32 or the positioning sheet 5 (as shown in FIG. 2B), then plug transmission cord (not shown) in the signal-output connector 35 for regular operation.

Although, this invention has been described in terms of preferred embodiments, it is apparent that numerous variations and modifications may be made without departing from the true spirit and scope thereof, as set forth in the following claims.

What is claimed is:

1. An improved foldable pushbutton-input device, comprising:

a baseboard, wherein a plurality of assembly-jointing sections is defined by a plurality of cutting lines in a predetermined interval;

a circuit board attached on said baseboard, said circuit board having a plurality of pushbutton-input circuit sections formed by cutting lines which correspond with the cutting lines of the assembly-jointing sections; and a signal-output circuit section is formed by extending a lateral edge of each said pushbutton-input circuit sections and connected therewith; and a plurality of key sets disposed on the pushbutton-input circuit sections of said circuit board, or on the assembly-jointing sections of said baseboard;

whereby said cutting lines permit said device to be folded.

2. The improved foldable pushbutton-input device of claim 1, wherein said baseboard may be made of a metallic or a hard plastic material.

3. The improved foldable pushbutton-input device of claim 1, wherein said circuit board is made of a flexible Polyester board material.

4. The improved foldable pushbutton-input device of claim 1, wherein said key set comprises a link (bridge) pivotally mounted on said circuit board or said baseboard, an elastomer disposed in said link, and a key cap assembled on said elastomer and jointed with said link.

5. The improved foldable pushbutton-input device of claim 1, wherein at least a slot is formed in said signal-output circuit section of said circuit board at a position corresponding with said cutting lines.

6. The improved foldable pushbutton-input device of claim 1, wherein a signal-output connector is jointedly disposed at a terminal edge of the signal-output circuit section of said circuit board.

7. The improved foldable pushbutton-input device of claim 1, wherein a binding area is predetermined in the assembly-jointing sections of said baseboard and the signal-output circuit section of said circuit board respectively in corresponding positions for folding inwardly and oppositely said assembly-jointing sections and said signal-output circuit section to facilitate positioning of said assembly-jointing sections.

8. The improved foldable pushbutton-input device of claim 1, wherein a positioning sheet made of a flexible Polyester material may be disposed underneath said baseboard to serve as an auxiliary measure for positioning said assembly-jointing sections.

* * * * *